United States Patent Office 2,860,063
Patented Nov. 11, 1958

2,860,063

COMPOSITION FOR APPLYING ORGANIC FILM TO PHOSPHOR LAYER

Miriam G. Groner, New Britain, Pa., assignor to Philco Corporation, Philadelphia, Pa., a corporation of Pennsylvania No Drawing. Original application October 31, 1951, Serial No. 254,195, now Patent No. 2,749,252, dated June 5, 1956. Divided and this application January 17, 1956, Serial No. 559,544

10 Claims. (Cl. 106—185)

The present invention relates to a novel film-forming composition for applying an organic film to the phosphor layer of cathode ray tube bulbs preparatory to the application of an aluminum film; and, more particularly, it relates to a novel nitrocellulose-containing film-forming composition for applying a nitrocellulose film to the phosphor layer of cathode ray tube bulbs in the preparation of aluminum-film backed luminescent phosphor screens in cathode ray tubes wherein limitations and disadvantages of prior compositions and methods based thereon are overcome. The present application is a division of application Serial No. 254,195, filed October 31, 1951, now Patent Number 2,749,252.

Luminescent screens such as employed in cathode ray tubes, including those used in oscilloscopes, television, radar, and the like, comprise a layer, adhered to the inside of the glass face of the cathode ray tube bulb (referred to herein as the glass substrate), of fine particles of inorganic material which is capable of absorbing energy and of re-emitting it as visible radiation at a temperature below that required for incandescence. Such material is known as phosphor material, and comprises oxygen-containing compounds the cation of which is a metal such as zinc, cadmium, beryllium, magnesium, calcium, zirconium, and the like, for example, zinc oxide, zinc phosphate, zinc silicate, cadmium silicate, zinc beryllium silicate, magnesium silicate, calcium magnesium silicate, calcium tungstate, zinc germanate, zinc beryllium germanate, zinc zirconium germanate, and the like; and metal sulfides, such as zinc sulfide, cadmium sulfide, calcium sulfide, barium sulfide, strontium sulfide, and the like, and metal fluorides such as zinc fluoride, magnesium fluoride, and the like.

Because of certain limitations with phosphor layers alone, it is the practice in many applications to provide a film of aluminum over the back of the phosphor layer. This aluminum film maintains the phosphor layer near the anode potential whereas, without the film, the phosphor layer, due to its nonconductivity, would become charged at high voltages to the point where further energy input would not result in further light output. In addition, the aluminum film reflects light emanating from the phosphor layer in the direction of the back of the tube and which would normally be lost and which would reduce contrast in the image on the screen. Thus, the aluminum film provides greater brightness and contrast in the image on the luminescent screen, or permits less power input to achieve the brightness and contrast normally available without the aluminum film.

Among the various methods suggested and attempted for applying the aluminum film to the phosphor layer is included the method involving the condensation of aluminum vapor on a film of organic material previously applied to the phosphor layer, followed by the volatilization of the organic film by heat leaving behind a smooth film of aluminum. The present invention relates to an improved film-forming composition for applying the organic film to the phosphor layer preparatory to the application of the aluminum film.

The general method of preparing a phosphor screen comprises permitting the phosphor to settle out of an aqueous suspension thereof as a layer onto the glass substrate. A binder, usually a water-soluble silicate, is incorporated in the suspension to cause the phosphor to adhere to the glass substrate. Where it was desired to apply an organic film to the phosphor layer, attempts to apply a lacquer to the surface of the suspending medium itself in order to deposit the film by decanting the suspending medium proved a failure. Because of the stresses and distortion involved in order to cause the film to settle onto the phosphor layer, the lacquer film would break, pull away from the phosphor layer, and the like, and it was thus impossible to provide the desired film. A small amount of water could not be substituted for the relatively large volume of suspending medium without damaging the wet phosphor layer. Therefore, it was necessary to complete the preparation of the phosphor screen, by removing the suspending medium, drying and finally baking, and only after this had been accomplished could the organic film be applied. The method of application usually involved adding, after the preparation of the phosphor screen had been completed as described above, a small quantity of water to the bulb—just enough to cover the phosphor layer—adding a small amount of nitrocellulose lacquer to the surface of the water whereby it spread forming a film over the water, decanting the underlying water leaving behind the film of nitrocellulose resting on the phosphor layer, drying the resulting assembly, and finally, after the application of the aluminum film, again baking the assembly to remove the organic material. This procedure was not only time-consuming and laborious, but also involved extra steps during which the phosphor screen was susceptible to contamination and disturbance. Thus, means whereby the organic film and phosphor layer can be prepared during one operation, necessitating but one decanting and drying operation, and eliminating a baking step as well as the second separate addition of water, removal thereof and drying, would be highly desirable. However, because of the nature of the problems involved no such means which is commercially satisfactory has been developed prior to the present invention.

The principal object of the present invention is to provide a novel film-forming composition adapted for application to the phosphor-suspending medium itself enabling the provision of the phosphor layer and organic film by one operation with its attendant advantageous features as discussed herein.

Other objects will be apparent from a consideration of the following specification and claims.

The novel liquid composition of the present invention comprises a small amount of nitrocellulose, a water-insoluble plasticizer therefor and octyl acetate dissolved in a mixture comprising a water-soluble alcohol selected from the group consisting of a propyl alcohol and a butyl alcohol and a volatile ester selected from the group consisting of a propyl acetate and a butyl acetate, said volatile ester being the major constituent of said composition.

In use, the composition is applied to the surface of the aqueous phosphor-suspending medium on the glass substrate in the cathode ray tube bulb; the composition is permitted to spread over the surface of the aqueous suspending medium to the sides of the cathode ray tube bulb; and, after the phosphor has settled as a layer onto the glass substrate, the aqueous suspending medium is removed from between the phosphor layer and nitrocellulose film whereby the nitrocellulose film settles and rests on the phosphor layer, and the assembly is then dried.

It will be noted that the various ingredients of the film-forming composition other than the nitrocellulose and the water-soluble alcohol, are solvents for nitrocellulose. The alcohol serves as a diluent so that the initial composition is a relatively thin solution of the nitrocellulose in the various liquids. The alcohol also provides other advantageous features more fully discussed hereinafter. Such a thin mobile solution readily spreads over the aqueous phosphor-suspending medium forming a film containing nitrocellulose thereover the edges of which adhere to the sides of the cathode ray tube bulb. The described alcohols are, as stated, water-soluble, and the described propyl and butyl esters are volatile. This means that when the composition is applied to the aqueous phosphor-suspending medium and spreads thereover, these materials gradually become removed from the layer of film-forming composition, by being leached into the aqueous layer in the case of the alcohol, and by being vaporized into the air above the layer of film-forming composition in the case of the volatile ester. This continues until the nitrocellulose-containing layer loses its liquid nature and becomes a tacky, flexible, extensible solid film. The octyl acetate, being insoluble in the aqueous layer and of low volatility remains in the nitrocellulose film imparting thereto, along with the plasticizer, the stated tackiness, flexibility and extensibility. The aqueous suspending medium after the desired amount of phosphor has settled therefrom, may then be gradually removed, and this removal of the support for the nitrocellulose film causes it to sag and settle until it rests upon the phosphor layer. The residual flexibility and extensibility imparted to the film by the octyl acetate in conjunction with the plasticizer permits the film to sag, stretch, and otherwise withstand the stresses and distortion involved without breaking. In prior methods wherein only a limited amount of water was applied to the pre-formed phosphor screen, sagging and stretching of the film to such an extent were not involved, and hence there was no problem as there is when the film-forming material is applied to the suspending medium itself. After the aqueous suspending medium has been removed, further drying removes octyl acetate, and any residual water soluble alcohol and volatile ester, from the film causing the film to shrink and to assume a smooth, stretched character resting on the peaks of the phosphor particles in the phosphor layer. The aluminum film can then be deposited on the nitrocellulose film following well known techniques.

The organic film-forming composition of the present invention comprises nitrocellulose as the essential film-forming ingredient. Although various grades of this material may be used, for example those ranging from the ½ second grade up to the 1000 second grade, the 125–175 second grade has been found to be particularly applicable. The nitrocellulose, as stated, will be plasticized, that is it will have a plasticizer mixed therewith. Plasticizers, as is well known, are high boiling materials usually liquids, compatible with the material being plasticized, nitrocellulose in this case, to reduce brittleness and to impart flexibility thereto. The plasticizer employed in the present composition will be, as stated, substantially insoluble in water. There is a wide variety of such materials available for use as plasticizers for nitrocellulose including castor oil, the phthalates, such as dioctyl phthalate, diallyl phthalate, dibutyl phthalate, dicapryl phthalate, diethylene glycol phthalate, diphenyl phthalate, glycerol phthalate, methyl Cellosolve phthalate; other esters, such as triethylene glycon di-2-ethyl butyrate, acetyl tri-n-butyl citrate, amyl salicylate, benzyl benzoate, butoxy ethyl stearate, Cellosolve laurate, Cellosolve oleate, Cellosolve ricinoleate, Cellosolve stearate, glycerol monooleate, methyl Cellosolve stearate, and the like; tricresyl phosphate; tetrabutyl urea; di-n-butyl lauramide; and the like. Of the various plasticizers available dioctyl phthalate and triethylene glycol di-2-ethyl butyrate are preferred.

With respect to the octyl acetate employed in the film-forming composition of the present invention, while any of the octyl acetates may be used, 2-ethyl hexyl acetate is preferred.

As stated, there is present in the organic film-forming composition a water soluble alcohol selected from the group consisting of a propyl alcohol and a butyl alcohol serving, in part, as a diluent removable into the aqueous layer. Of the alcohols available in this group, the propyl alcohols, that is, n-propyl alcohol and isopropyl alcohol, are preferred, particularly the latter, since they are infinitely soluble in water. Mixtures of a butyl alcohol and a propyl alcohol may also be employed, and when such a mixture is used it is preferred that the propyl alcohol make up at least half of the mixture.

With respect to the main solvent component of the organic film-forming composition, it is, as stated, a volatile ester selected from the group consisting of a propyl acetate and a butyl acetate. Of the acetates available in this group, the propyl acetates, that is, n-propyl acetate and isopropyl acetate, are preferred, particularly the former, since they are more volatile than are the butyl acetates. Mixtures of a butyl acetate and of a propyl acetate may also be employed, and when such a mixture is used it is preferred that the propyl acetate make up the last half of the mixture.

The proportions of the various ingredients in the organic film-forming composition of the present invention may vary somewhat depending, for example, upon the size and shape of the cathode ray tube bulb. As stated, the volatile ester component will be present in a preponderant amount. That is to say, the volatile ester will be the major constituent of the composition. Generally, the volatile acetate will be present in an amount of at least 50%, by weight, of the composition and may be present in an amount as high as about 80%. The nitrocellulose, of course, will make up only a small portion of the composition, and is generally present in an amount between about 3.5% and about 5%, by weight. The plasticizer, as is well known, is generally present in an amount less than the nitrocellulose, and in the composition employed in accordance with the present invention, the amount thereof will generally range between about 1.5% and about 3%, by weight. Since the octyl acetate remains in the film during the removal of the aqueous layer and the setting of the film and imparts, along with the plasticizer, the necessary flexibility and extensibility to the film, the proportion thereof employed may depend upon the amount of distortion which the film will encounter during removal of the aqueous layer. This in turn is dependent upon the design or shape of the cathode ray tube bulb being treated. For example, the more acute the angle between the bulb wall and the face of the bulb the greater the distortion encountered by the film during deposition thereof. Thus the greater the distortion encountered by the film the higher the proportion of octyl acetate required. Likewise, the proportion of octyl acetate will depend upon the area over which the film must spread which is determined by the size of bulb. The greater the size of the bulb and hence area over which the film must spread, the greater the proportion of octyl acetate. Hence the octyl acetate may range from about 5%, by weight, of the composition to as high as about 25%, by weight, of the composition. The amount of water-soluble alcohol employed may range from as low as about 5%, by weight, of the composition to as high as about 25%. Particularly advantageous proportions of ingredients which provide a composition suitable for most cathode ray tube bulbs are as follows: between about 4 and 4.8% of nitrocellulose, between about 2 and about 2.8% of plasticizer, between about 8 and about 15% of octyl acetate, between about 8 and about 15% of the water-soluble alcohol and between about 70 and about 75% of the volatile ester.

As stated, the organic film-forming composition is applied to the surface of the aqueous suspending medium from which the phosphor is being deposited onto the glass substrate of the cathode ray tube bulb. This method of applying the phosphor to the glass substrate is well known in the art being one of the most widely used methods of preparing the phosphor screen. In general, the suspension of phosphor particles is prepared in water also containing a soluble binder, such as a soluble silicate including potassium silicate, sodium silicate, and the like. There is also often incorporated in the settling medium an electrolyte salt to lower the zeta potential of the phosphor and of the glass substrate. In the general method of depositing the phosphor the stated suspension is introduced to the cathode ray tube bulb held in a vertical position with its neck extending upwardly so that the suspension rests on the inside of the face of the bulb. The suspension is held in that position until the desired amount of phosphor particles settle out as a layer onto the glass surface. The particular technique of introducing the suspension of the cathode ray tube bulb may vary somewhat. For example, the complete suspension may be added as a body to the bulb, or water containing one or more of the components of the suspending medium may be first added to the bulb followed by the addition of the phosphor such as in the form of a concentrated suspension thereof which may contain one or more of the other components of the suspending medium.

The phosphor suspension is introduced into the cathode ray tube bulb, following one of the customary procedures as discussed above, the cathode ray tube bulb being in the vertical position with its neck extending upwardly so that the suspension uniformly covers the inside face of the bulb. The amount of aqueous suspension employed will depend, of course, upon the concentration of phosphor therein, the size of the bulb, and the like considerations well known to those skilled in the art. Following this, and after excessive turbulence of the suspension has subsided the stated organic film-forming composition is applied to the surface of the aqueous suspending medium. In this connection, it should be pointed out that during decanting of the aqueous suspending medium, the liquid should pour smoothly and easily out the neck of the bulb. In certain circumstances, particularly with smaller bulbs having long necks, the amount of phosphor-suspending medium may be such as substantially to fill the body of the bulb, and thus, during decanting, the suspending medium will not pour out the neck of the bulb without obstructing the passageway and preventing the entrance of air into the bulb. The resulting pulsating flow and back wash of liquid in the bulb as the air forces its way into the bulb would be detrimental to the nitrocellulose film and phosphor layer, and, therefore, is to be avoided. Thus, in such situation, a portion of the suspending medium may be removed as by syphoning, after the desired amount of phosphor has settled thereupon, to reduce the amount of suspending medium in the bulb to where smooth even pouring is provided.

The film-forming composition may be added to the suspending medium as by permitting it to run onto the surface thereof from, for example, a thin tube. In this connection, the end of the tube or other applicating device, should not be so far above the surface of the suspending medium as to cause splashing, breaking up of the film-forming composition into droplets, and the like; nor so close to the surface as to touch it. A convenient test to determine a proper distance between the surface of the suspending medium and end of the applicating device is to bring the end of the applicating device progressively nearer the surface of the suspending medium until a vapor wave is seen to pass across the surface. This wave is caused by the solvent vapors issuing from the end of the applicating device contacting the surface of the suspending medium. It has been found that the point where this vapor wave appears defines a suitable distance from which to run the film-forming composition onto the suspending medium.

The film-forming composition, being immiscible with and lighter than the aqueous suspending medium, remains on the surface thereof, and rapidly spreads over the surface until it reaches the sides of the cathode ray tube bulb. Only a small amount of the composition is required for this purpose. The exact amount, will, of course, depend upon the size of the tube treated, and in any particular case the amount of composition required can be readily determined visually. After the application of the composition to the suspending medium the volatile ester gradually evaporates therefrom and the water-soluble alcohol gradually leaches therefrom into the aqueous suspending medium. Thus, in a relatively short time the layer of organic film-forming composition becomes converted to a tacky, flexible, extensible film comprising the nitrocellulose, plasticizer and octyl acetate, adhering to the sides of the cathode ray bulb. During this period following the addition of the composition, further settling of phosphor particles from the suspension onto the glass substrate may take place.

When the phosphor layer has been deposited, the layer of the aqueous suspending medium between the deposited phosphor layer and the nitrocellulose film is removed. The preferred method of removing this aqueous layer is by decantation, as by slowly tipping the bulb permitting the aqueous medium to pour out the neck thereof. The phosphor layer, however, adheres to the glass surface onto which it has been deposited and remains behind. During the removal of the aqueous layer, the nitrocellulose film, riding on the surface of the layer and being supported thereby, but adhering to the sides of the tube, gradually sags and settles with the lowering level of aqueous medium until it rests upon the phosphor layer. Although the film is sufficiently flexible and extensible to withstand the distortion involved it is sufficiently strong to withstand breaking and thus pouring out the neck of the bulb with the suspending medium. An important feature of the present invention is that the water-soluble alcohol dissolved into the aqueous suspending medium from the film-forming composition is present in the liquid immediately surrounding the phosphor particles. This results in a decrease in surface tension that minimizes the amount of liquid trapped between the nitrocellulose film, phosphor layer and glass substrate, and permits rapid drying of the film without blistering thereof. Moreover the alcohol, being both miscible with the nitrocellulose film and soluble in the aqueous medium, increases the bond between the film and the phosphor layer. The alcohol dissolved in the aqueous layer may also increase the amount of gelation of the silicate binder used in the settling procedure.

Following the removal of the water as discussed above, the assembly may be subjected to a brief drying treatment to remove adhering water and to cause the film to shrink. This treatment may involve merely the passage of air over the film. On the other hand, the phosphor layer and the film assembly may be subjected to a mild heat treatment, as by heating the tube up to about 70–80° C., to drive off moisture. During this drying treatment, octyl acetate, and any residual water-soluble alcohol and volatile ester remaining in the film are removed causing the film to shrink, lose most of its flexibility and extensibility, and causing it to assume a smooth, stretched form resting on the peaks of the phosphor particles. As such, it is ideally suited to serve as a base upon which to deposit the aluminum layer. The plasticizer, of course, for the most part remains in the film and prevents embrittlement thereof.

Following drying, and after application of the usual graphite coating serving as the second anode of the finished cathode ray tube, the aluminum film may be applied in accordance with well known procedure. Generally, a small amount of aluminum is vaporized within the tube, and this aluminum vapor condenses on the nitrocellulose film and sides of the cathode ray tube bulb. The procedures, including the amount of aluminum deposited, are well known to those skilled in the art, and need not be discussed in detail here.

Following the deposition of the aluminum, the nitrocellulose film has performed its function and may be removed. The removal generally involves the use of heat to vaporize the nitrocellulose film. The temperature to which the bulb may be heated for this purpose will vary, as known to those skilled in the art, depending upon the particular type of phosphor material employed. For example, if the phosphor consists of a metal sulfide, temperatures in excess of about 425° C. are generally not employed, whereas when the phosphor consists of an oxide the temperature may go as high as about 550° C. In any case, the temperature will be at least about 300° C., and generally in practice at least about 370° C. During heating, the nitrocellulose film decomposes and vaporizes and the vaporized material is removed through the neck of the cathode ray tube bulb. This heating also bakes the phosphor layer causing it to become securely attached to the glass substrate.

Following the removal of the film the bulb is treated in the customary way. For example, the bulb may be sealed and exhausted in accordance with standard procedure.

The process and film-forming composition of the present invention will be more easily understood from a consideration of the following specific examples which are given for the purpose of illustration only and are not intended to limit the scope of the invention in any way.

*Example I*

A solution prepared by mixing 10 cc. of a 1% barium acetate solution in 380 cc. of water is poured into a round-faced television bulb having a face diameter of 4 inches. The bulb is held in a vertical position, with its neck up, on a decanting table. To this is added a suspension consisting of 0.26 g. of zinc cadmium sulfide phosphor (activated with silver) and 4 cc. of liquid potassium silicate containing about 28% solids, in 30 cc. of distilled water. This liquid substantially fills the body of the bulb.

The phosphor is allowed to settle from the aqueous medium for 20–30 minutes, after which some of the supernatant aqueous medium is siphoned off until the bulb is about half full.

To the surface of the remaining liquid is added one drop of a composition prepared by mixing 5 g. of nitrocellulose (125–175″), 3 g. dioctyl phthalate, 8.7 g. of octyl acetate (2-ethyl hexyl acetate), 12 g. isopropyl alcohol and 80.8 g. n-propyl acetate. This is allowed to spread for about ½ minute to form a thin film over the surface of the suspending medium and contacting the sides of the bulb. The decanting table is then started at a rate such that the suspending medium is removed in about 5–8 minutes. During decanting of the aqueous suspending medium, the nitrocellulose-containing film rides down on its surface until it rests on and clings to the phosphor layer. The edges of the film adhere at the points around the sides of the bulb where the film initially contacted the bulb, so that the settling of the film is by virtue of sagging and stretching thereof.

After removal of the suspending medium, the bulb is placed in an air dryer in an inverted position to remove adhering water after which the usual graphite coating is applied to the bulb cone and neck. An aluminum film is then applied to the inside of the bulb including the graphite-coated cone and neck and the nitrocellulose film by evaporating 20 mg. of aluminum under vacuum within the bulb and allowing it to condense on the inside walls of the bulb and on the nitrocellulose film.

The aluminized bulb is then heated at 425° C. for 30 minutes to remove the nitrocellulose film and bake the phosphor layer and graphite coating, following which the bulb is sealed and exhausted following customary procedure.

*Example II*

Into a rectangular-faced television bulb having a diagonal distance across the face of 17 inches and placed on a decanting table in the vertical position with its neck up, is poured a suspension prepared by mixing 4.5 g. of a mixture of zinc sulfide and zinc cadmium sulfide phosphor (activated with silver), 75 cc. of liquid potassium silicate (containing about 28% solid) and 130 cc. of a 1% aqueous barium acetate solution with 7050 cc. of water. The phosphor is allowed to settle from the aqueous medium for 20–30 minutes.

To the surface of the suspending medium is added 0.6–0.8 cc. of a composition prepared by mixing 5 g. nitrocellulose (125–175″), 3 g. dioctyl phthalate, 13.1 g. octyl acetate (2-ethyl hexyl acetate), 12 g. isopropyl alcohol and 80.8 g. of n-propyl acetate. The film is allowed to spread and set for about ½ minute.

The bulb is then gradually tilted to cause the suspending medium slowly to pour out its neck until the aqueous suspending medium is removed after about 5–8 minutes. The bulb is then heated in an oven equipped with an air flush at 60° C. for 30 minutes, after which the bulb is placed in an air dryer at room temperature until cool and thoroughly dry.

The usual internal graphite coating is applied to the neck of the bulb with a strip extending up to and over the contact button, after which the film of aluminum is applied by evaporating 200 mg. of aluminum under vacuum within the bulb and permitting it to condense on the walls of the bulb and on the nitrocellulose film.

The aluminized bulb is then baked at 425° C. for 30 minutes to remove the nitrocellulose film and to bake the phosphor layer and graphite coating, after which the bulb is sealed and exhausted following customary procedures.

Following the general principles set forth in the specification and the procedures outlined in Examples I and II above other film-forming compositions corresponding to those set forth in the following table may be employed. The figures are in terms of percent by weight of the composition:

| Ex. | Nitrocellulose | Plasticizers (1) | Plasticizers (2) | Octyl Acetate | Isopropyl Alcohol | n-butyl Alcohol | Propyl Acetate³ | n-butyl Acetate |
|---|---|---|---|---|---|---|---|---|
| 3 | 4.1 | 1.6 | | 14.5 | 16.6 | | 63.2 | |
| 4 | 4.2 | | 2.1 | 14.4 | 16.5 | | 62.8 | |
| 5 | 4 | 1.6 | | 21.0 | 16.0 | | 57.4 | |
| 6 | 4.8 | 1.9 | | 5.8 | 19.1 | | 68.4 | |
| 7 | 4.45 | 1.79 | | 7.76 | 17.9 | | 68.1 | |
| 8 | 4.45 | 2.2 | | 11.65 | 17.8 | | 63.9 | |
| 9 | 4.3 | 2.6 | | 14.3 | 10.1 | | 68.7 | |
| 10 | 5.2 | 2.6 | | 12.6 | 10.3 | | 69.3 | |
| 11 | 4.1 | | 2.5 | 15.1 | 33.3 | | | 45.0 |
| 12 | 4.1 | | 2.5 | 17.8 | 32.2 | | | 43.4 |
| 13 | 4.5 | | 2.7 | 11.6 | 10.5 | | | 70.7 |
| 14 | 4.5 | | 2.6 | 11.8 | 10.6 | | 70.5 | |
| 15 | 4.4 | | 2.6 | 11.4 | | 10.6 | 71 | |
| 16 | 4.6 | | 2.9 | 8.1 | 10.9 | | | 73.5 |
| 17 | 4.3 | | 2.5 | 15.1 | 10.1 | | | 68.0 |
| 18 | 4.1 | | 2.5 | 18.0 | 9.7 | | | 65.7 |

¹ Dioctyl phthalate.
² Triethylene glycol di-2-ethyl butyrate.
³ n-Propyl acetate except Example 14 in which case the propyl acetate is isopropyl acetate.

Considerable modification is possible in the combinations of the various constituents of the film-forming composition and amounts thereof without departing from the scope of the invention.

I claim:

1. A film-forming composition for application to the surface of the aqueous phosphor-suspending medium on the glass substrate in the cathode ray tube bulb in the preparation of an organic film on the phosphor layer of a cathode ray tube bulb, consisting essentially of between about 3.5% and about 5%, by weight, of nitrocellulose having a viscosity from about ½ to about 1,000 seconds, a water-insoluble plasticizer therefor and between about 5% and about 25%, by weight, octyl acetate dissolved in a mixture consisting essentially of a water-soluble alcohol selected from the group consisting of a propyl alcohol and a butyl alcohol and a volatile ester selected from the group consisting of a propyl acetate and a butyl acetate the said volatile ester being the major constituent in said composition.

2. The composition of claim 1 wherein the water-soluble alcohol consists essentially of a propyl alcohol, and wherein the volatile ester consists essentially of a propyl acetate.

3. The composition of claim 1 wherein at least half of the water-soluble alcohol is a propyl alcohol and wherein at least half of the volatile ester is a propyl acetate.

4. The composition of claim 1 wherein the water-soluble alcohol is isopropyl alcohol, and wherein the volatile ester is n-propyl acetate.

5. A film-forming composition for application to the surface of the aqueous phosphor-suspending medium on the glass substrate in the cathode ray tube bulb in the preparation of an organic film on the phosphor layer in a cathode ray tube bulb consisting essentially of between about 3.5% and about 5% of nitrocellulose having a viscosity from about ½ to about 1,000 seconds, between about 1.5% and about 3% of a water-insoluble plasticizer therefor, between about 5% and about 25% of octyl acetate, between about 5% and about 25% of a water-soluble alcohol selected from the group consisting of a propyl alcohol and a butyl alcohol and between about 50% and about 80% of a volatile ester selected from the group consisting of a propyl acetate and a butyl acetate, said percentages being by weight.

6. The composition of claim 5 wherein the water-soluble alcohol consists essentially of a propyl alcohol, and wherein the volatile acetate consists essentially of a propyl acetate.

7. The composition of claim 5 wherein at least half of the water-soluble alcohol is a propyl alcohol, and wherein at least half of the volatile ester is a propyl acetate.

8. The composition of claim 5 wherein the water-soluble alcohol is isopropyl alcohol, and wherein the volatile ester is n-propyl acetate.

9. A film-forming composition for application to the surface of the aqueous phosphor-suspending medium on the glass substrate in the cathode ray tube bulb in the preparation of an organic film on the phosphor layer of a cathode ray tube consists essentially of between about 4 and about 4.8% of nitrocellulose having a viscosity from about ½ to about 1,000 seconds, between about 2 and about 2.8% of a water-insoluble plasticizer therefor, between about 8% and about 15% of octyl acetate, between about 8 and about 15% of a water-soluble alcohol selected from the group consisting of a propyl alcohol and a butyl alcohol, and between about 70% and about 75% of a volatile ester selected from the group consisting of a propyl acetate and a butyl acetate, said percentages being by weight.

10. The product of claim 9 wherein the nitrocellulose has a viscosity from about 125 to about 175 seconds.

References Cited in the file of this patent

UNITED STATES PATENTS

| | | |
|---|---|---|
| 2,040,916 | Bjerg | May 19, 1936 |
| 2,310,866 | Pitman | Feb. 9, 1943 |
| 2,337,524 | Michael | Dec. 21, 1943 |
| 2,616,816 | De Gier et al. | Nov. 4, 1952 |
| 2,689,187 | Thomsen | Sept. 14, 1954 |

OTHER REFERENCES

Concise Chemical and Technical Dictionary (1947), Chemical Publishing Co., Brooklyn, N. Y., page 678.

Moore et al.: J. Appl. Chem., 5, January 1955 (pp. 34–39).

"What You Can Use," Oil, Paint and Drug Reporter (July 3, 1939–August 21, 1939).